United States Patent [19]

Keller et al.

[11] Patent Number: 4,975,862

[45] Date of Patent: Dec. 4, 1990

[54] PROCESS AND APPARATUS FOR THE INK CONTROL OF A PRINTING MACHINE

[75] Inventors: Guido Keller, Zurich, Switzerland; Helmut Kipphan, Schwetzingen, Fed. Rep. of Germany

[73] Assignees: Gretag Aktiengesellschaft, Regensdorf, Switzerland; Heidelberger Druckmaschinen AG, Heidelberg, Fed. Rep. of Germany

[21] Appl. No.: 293,528

[22] Filed: Jan. 5, 1989

[30] Foreign Application Priority Data

Jan. 14, 1988 [CH] Switzerland ........................ 120/88-5
Apr. 6, 1988 [CH] Switzerland ........................ 1268/88-9

[51] Int. Cl.[5] ........................ G01N 21/25

[52] U.S. Cl. ........................ 364/526; 101/211; 101/365

[58] Field of Search ............... 364/526, 525, 578, 523, 364/471; 356/425, 421, 407, 402; 101/365, 211, 171

[56] References Cited

U.S. PATENT DOCUMENTS

| | | | |
|---|---|---|---|
| 3,322,025 | 5/1962 | Dauser . | |
| 3,958,509 | 5/1976 | Murray et al. | 101/426 |
| 3,995,958 | 12/1976 | Pfahl et al. . | |
| 4,003,660 | 1/1977 | Christie, Jr. et al. | 356/407 |
| 4,076,421 | 2/1978 | Kishner . | |
| 4,151,796 | 5/1979 | Uhrig | 101/142 |
| 4,183,657 | 1/1980 | Ernst et al. | 355/14 R |
| 4,185,920 | 1/1980 | Suga | 356/406 |
| 4,200,932 | 4/1980 | Schramm et al. | 364/579 |
| 4,210,078 | 7/1980 | Greiner et al. | 101/136 |
| 4,210,818 | 7/1980 | Green et al. | 250/559 |
| 4,217,648 | 8/1980 | Thurm et al. | 364/526 |
| 4,256,131 | 3/1981 | De Remigis | 137/3 |
| 4,289,405 | 9/1981 | Tobias | 356/407 |
| 4,309,496 | 1/1982 | Miller | 430/30 |
| 4,390,958 | 6/1983 | Mamberger | 101/365 |
| 4,403,866 | 9/1983 | Falcoff et al. | 366/132 |
| 4,439,038 | 3/1984 | Mactaggart | 356/408 |
| 4,488,808 | 12/1984 | Kato | 356/73 |
| 4,494,875 | 1/1985 | Schramm et al. | 356/402 |
| 4,505,589 | 3/1985 | Ott et al. | 356/402 |
| 4,510,866 | 4/1985 | Sekizawa et al. | 101/365 |
| 4,527,897 | 7/1985 | Okabe | 356/402 |

(List continued on next page.)

FOREIGN PATENT DOCUMENTS

| | | |
|---|---|---|
| 1199521 | 1/1986 | Canada . |
| 1206803 | 7/1986 | Canada . |
| 069572 | 12/1983 | European Pat. Off. . |
| 2012213 | 7/1979 | United Kingdom . |
| 2071573 | 9/1981 | United Kingdom . |

OTHER PUBLICATIONS

CIE "Recommendation on Uniform Color Spaces'-'-Color Difference Equations Psychometric Color Terms Supp. No. 2 to CIE Publ. No. 15 (E-1.3.1) 1971.

International Standard "Photography-Density Measurements Part 3: Special Conditions" First Edition 1984-08-15 UDC 771.534.531.

"A New Color Control System For Gravure" (Brand et al.) May 1987.

"Spectrophotometric Instrumentation For Graphic Arts" (Celio, 1988 TAGA Proceedings ).

*Primary Examiner*—Parshotam S. Lall
*Assistant Examiner*—S. A. Melnick
*Attorney, Agent, or Firm*—Burns, Doane, Swecker & Mathis

[57] ABSTRACT

A three-color offset printing machine produces, during the printing of sheets, color measuring strips with several color measuring fields. A gray half-tone field produced by the overprinting of three colors serves as the reference field. The color location of the reference field is compared in a color deviation computer with the color location of a correlated desired reference field. From the color deviation, a layer thickness variation computer calculates a layer thickness variation control vector by means of a sensitivity matrix calculated on the basis of a linear model by a matrix computer. The matrix computer evaluates a series of secondary fields comprising three single color half-tone fields, three single color full-tone fields, three two-color full-tone fields, and a three-color full-tone field.

23 Claims, 3 Drawing Sheets

U.S. PATENT DOCUMENTS 4,535,413 8/1985 Siota et al. .......... 364/526
4,539,647 9/1985 Kaneko et al. .......... 364/526
4,541,336 9/1985 Bernauer .......... 101/211
4,553,033 11/1985 Hubble, III et al. .......... 250/353
4,561,103 12/1985 Horiguchi et al. .
4,586,148 4/1986 Rehder et al. .......... 364/550
4,649,502 3/1987 Keller et al. .......... 364/519
4,660,159 4/1987 Ott .......... 364/526
4,665,496 5/1987 Ott .......... 364/526
4,667,596 5/1987 Dotzel et al. .......... 101/211
4,671,661 6/1987 Ott .......... 356/402
4,706,206 11/1987 Benoit et al. .......... 364/526
4,717,954 1/1988 Fujita et al. .......... 358/80
4,752,892 6/1988 Lecha .......... 364/578
4,813,000 3/1989 Wyman et al. .......... 364/526

PROCESS AND APPARATUS FOR THE INK CONTROL OF A PRINTING MACHINE

BACKGROUND OF THE INVENTION

The invention relates to a process for the ink control of a printing machine with colorimetric ink control regulation, wherein on the printed sheet, color measuring strips with several color measuring fields are also printed. The color measuring strips are optically scanned by means of a measuring head in order to determine the spectral intensity distributions of the color measuring fields to thereby determine the spectral reflections and the color location of a reference field for the color measuring fields in a color coordinate system from a spectral color analysis of the measuring light, and to produce, by coordinate comparison, a control variable for the adjustment of the ink control elements of the printing machine using the color deviation of the color measuring field scanned, so that undesirable color deviations on the sheets subsequently printed with the new ink control settings will become minimal. This invention also relates to an apparatus for carrying out the process, the apparatus having at least one measuring head connected with a spectrometer to scan the co-printed color measuring fields, and a measured data processing unit for processing the measured data of the spectrometer into adjusting values for the printing machine.

A process of the aforementioned type is known from EP A No. 228 347, in which for the optimal adaptation of the color imprint, a plurality of color measuring fields are evaluated as reference fields, in order to obtain a proof having an optimal adaptation of the color imprint of sensitive locations of the print important for the image, whereupon in production printing, ink controls regulated by ink density may be superimposed on the ink controls regulated by color deviation. The spectral color analysis of a plurality of color measuring fields and the calculation of a multitude of color coordinates for every printed sheet requires a relatively high effort. This effort is further increased because deviation vectors are weighted for each of the numerous reference fields in the known process, in order to minimize the overall color deviation determined as a measure of quality from the amounts of the individual color deviations. To determine the layer thickness variations associated with the individual color measuring fields, it is necessary to multiply the color deviations vector correlated with the numerous reference fields with empirically determined conversion matrices. The empirical determination and storage of the numerous conversion matrices alone already represents a very great effort. As the printing ink components involved are corrected more or less independently of each other, an unfavorable convergence behavior is obtained. For this reason, the known process proposes to use separate color measuring fields for particularly critical color measuring fields, which again increases the overall effort.

SUMMARY OF THE INVENTION

Based on this state of the art, it is the object of the invention to further improve a process of the aforementioned type. In particular, it should be possible to avoid the use of color measuring fields especially adapted to the image content even in the case of particularly critical tones and still obtain ink controls with a high convergence velocity.

This object is attained according to the invention whereby for the color deviation determination, the spectral reflection values of a reference field in the form of a half-tone field are measured for the determination of an actual color location. The spectral reflections of color measuring fields serving as secondary fields are determined as secondary values, from which the sensitivity of the color location shift is calculated based on layer thickness variations. From the distance of the measured actual color location of the reference field and the desired color location of the reference field, and the sensitivity of the color location shift calculated on the basis of the secondary values, the layer thickness variations of the printing inks required as the relative correction value for the ink controls to compensate for the color location deviation of the actual color location of the reference field from the desired color location of the reference field, are determined.

In individual cases (i.e., in the case of certain subjects or of colored paper), it may be appropriate in the determination of the actual color location to standardize not on absolute white, but on paper white.

The layer thickness variation determined in this manner may also be converted, for example by means of the Tollenaar function, into a density variation.

However, in place of the layer thickness it is also possible to determine the sensitivity of the color location shift from a density variation directly. It is convenient to correct density values for this purpose. This may be accomplished for example by the Saunderson correction. By means of a sensitivity matrix determined in this manner a density variation control vector is then calculated, which should lead to density variations shifting the measured color location as close as possible to the desired color location.

The following examples of the embodiment are based on a sensitivity matrix relative to layer thicknesses. However, they are easily converted to a sensitivity matrix based on densities. In an appropriate exemplary embodiment of the invention for a multicolor, for example four-color, offset printing machine, the reference field is a gray field produced by the overprinting of three half-tones with the three standard printing inks. Black and decorating colors in the case of 5 and 6-color machines are treated specially, as described below in detail. The control process according to the invention compares the color location of the actual gray field printed on a sheet with the stored color location of the gray field on what has been determined to be an "O.K. sheet" or with a numerically entered desired color location. From the deviation between the actual color location and the desired color location, a color deviation vector is determined and a layer thickness variation control vector is calculated, (theoretically) which should have the effect of shifting the measured color location as close to the desired color location as possible. The process of the invention thus, on the one hand, is a relative model, as the measured reflection or the color location of the corresponding three-color halftone field is used as its basis and the reflection variation resulting from a change in ink controls is calculated relatively to it. Because the accuracy requirements are lower in the case of such a relative model than with an absolute model which carries out color location determinations without reference to an already existing intermediate value, a linear substitute function in the working point measured is sufficient as the simplest method of model formation, to achieve a high convergence velocity in a relative model, provided the obvious assumption of a correct sign is satisfied. In a preferred exemplary embodiment, a model is formed for the determination of color location variations from a layer density variation based on partially differentiated Neugebauer equations.

For every color location of the gray field serving as the reference field, a sensitivity matrix is calculated individually and formed after inversion as the conversion matrix to produce a layer thickness variation control vector from the color deviation vector. In order to obtain high accuracy it is appropriate to redetermine all of the values needed for the formation of the elements of the sensitivity matrix for every print. The values required are produced by evaluating the spectral reflection values of three half-tone fields in the printing colors involved, three full-tone fields in the printing colors involved, three full-tone fields with two colors printed over, a full-tone field with all of the printing colors printed over, and finally a field for the determination of the paper reflection.

BRIEF DESCRIPTION OF THE DRAWINGS

Other objects and advantages of the present invention will become more apparent from the following detailed description of preferred embodiments as described with reference to the drawings in which.

DETAILED DESCRIPTION OF THE PREFERRED EMBODIMENTS

Figure 1:
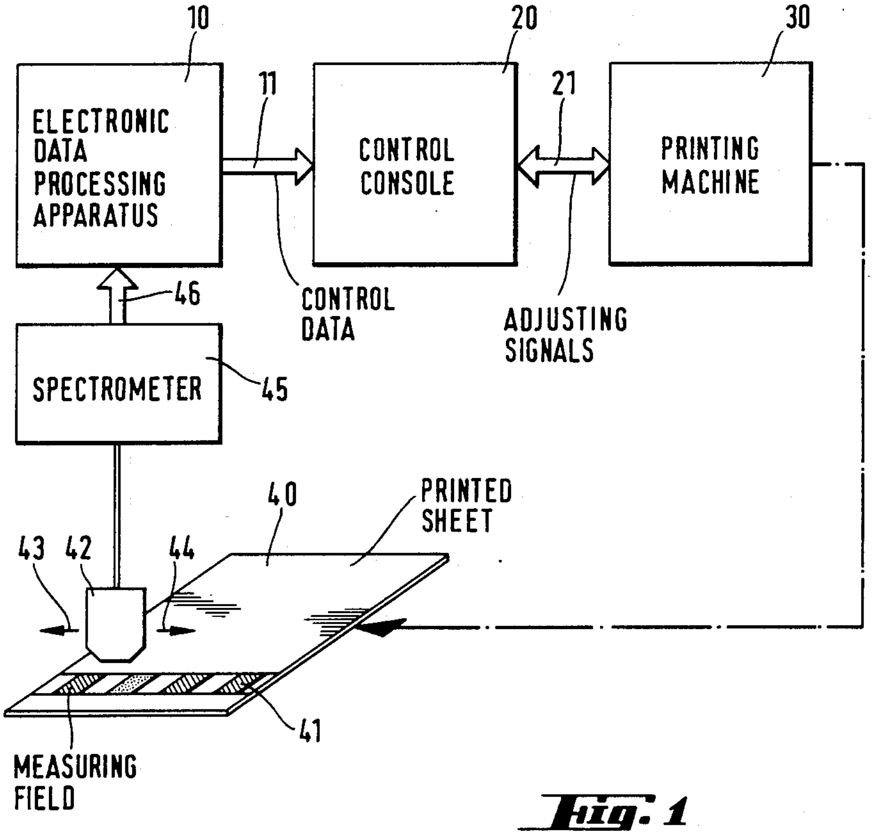
FIG. 1 shows a greatly simplified block diagram of a printing installation with the control process of the invention.

The printing installation shown in FIG. 1 comprises an electronic apparatus 10 for the processing of measured values, which produces the control data 11 corresponding to the undesirable color deviations in the individual printing zones and printing mechanisms and enters them as the input values in a control console 20. The control console 20 produces adjusting signals 21 from the control data 11 for the ink control elements of a machine 30 equipped with remotely controlled ink guidance, said machine being in particular a three-color offset printing machine, so that the color deviations on the sheet 40 printed on the machine 30 will be minimal.

During printing, the printing machine 30 will print color measuring fields 41 as the color measuring strips, wherein a block of a color measuring strip may extend for example over two zones of a printed sheet 40 comprising several zones.

In order to keep the color deviations of the printing colors involved in the printing small, the color measuring fields 41 are optically scanned manually or preferably automatically and continuously, by means of at least one measuring head 42, said measuring head being displaceable, by a motor, along the color measuring fields 41 of the color measuring strips printed with the sheets, in the direction of the arrows 43, 44. A second measuring head may be provided for manual scanning.

The measuring head 42 contains a source of white light, not shown, to illuminate the color measuring fields 41, for example at an angle of 45°, and an optical measuring light device to capture the light reflected from the color measuring fields 41, for example at an angle of 0°, and to pass it through an optical conductor to the inlet of a spectrometer 45. The spectrometer 45 serves to spectrally decompose the component of the white light reflected by the color measuring fields 41 co-printed for print monitoring, in order to make possible a spectral color analysis and thus a colorimetric analysis. The spectrometer 45 contains, for example, a holographic grid illuminated through an inlet gap for the spatial decomposition of the reflected light by wavelength and an array in rows of for example 35 photodiodes, which are exposed to a spectrally decomposed measuring light. The spectrometer 45 thus permits spectral color measurements at for example 35 support locations to determine the spectral reflections of a manually or automatically scanned color measuring field 41, to make it possible for the measured data processor 10 to derive colorimetric parameters. The measured data 46 present at the outlet of the spectrometer 45 travels through an interface, not shown, which among others, also carries out the digitalization of the data 46, to a computer layout contained in the data processing apparatus 10.

The computer layout of the electronic data processing apparatus 10 comprises an electronic driving device to supply the electric drive of the measuring head 42 and the illumination of the measuring head. As with a conventional computer, a data display device including a keyboard and a record printer are provided in order to display the data obtained in the spectral measured data determination as needed, and in particular to be able to enter constants and standard values manually.

In the electronic apparatus 10 for the processing of measured data, the measured data 46 are converted into spectral reflections relative to the paper white of the printed sheet 40 and color location coordinates. By comparing the color location coordinates of a color measuring field 41 serving as the reference field with stored desired color location coordinates, the control data 11 are produced on the basis of a color deviation determination between the desired color location and the color location actually determined on the printed sheet of the reference field, which preferably is a gray field of a three-color half-tone. The desired color location coordinates define a desired color location, which had been entered into a memory either manually through the keyboard, or by scanning the reference field of a printed sheet found to be good, a so-called "O.K. sheet". In the electronic apparatus 10 for the processing of measured data, the spectral photometric data, i.e. spectral reflections of preferably every printed sheet are converted into color location coordinates and compared with the stored desired color location coordinates, in order to continuously determine in a manner described in detail below, color deviations, and from them, control data 11 for the control console 20 and the ink control elements to guide the ink application.

Because the result obtained upon an adjustment of the ink control elements to correct the coloring, is scanned by the measuring head 42, the printing installation shown in FIG. 1 comprises a control loop for the elimination of color deviations. The prevailing color deviation is determined by the data processing apparatus 10, which in its memory contains as the control value the coordinates of a prevailing desired color location and produces the control data 11 as the adjusting value. In the case of the printing installation shown in FIG. 1, the control data 11 feed the printing machine 30 indirectly through the control console 20, which is usually present. It is obviously also possible to modify the printing installation so that the control data are acting directly on the ink control elements, for example, ink zone screws, of the printing machine 30.

Figure 2:
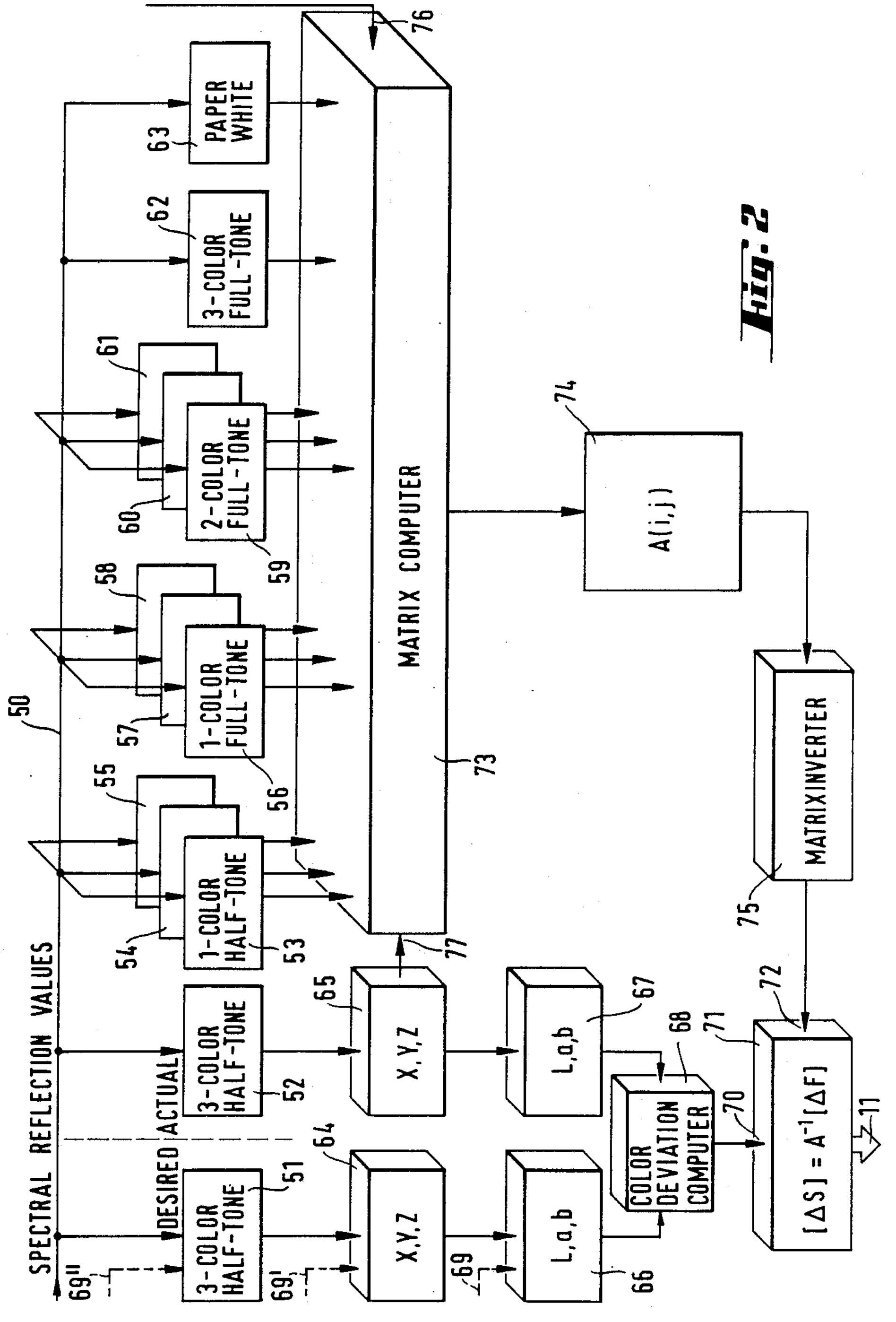
FIG. 2 shows a block diagram to illustrate a possible embodiment of the apparatus for the processing of measured values.

The mode of operation and the layout of the electronic data processing apparatus 10 are shown in detail in FIG. 2. The spectral reflection values supplied by the spectrometer 45 arrive through an inlet bus 50 in the reflection value memories 51 to 63 correlated with the individual color measuring fields 41. The reflection value memory 51 serves to store the reflection values $\beta_{R123}$ measured at 35 different wavelengths of a three-color half-tone field on the O.K. sheet.

A three-color half-tone field on every newly printed sheet 40 corresponds to the three-color half-tone field on the O.K. sheet. The color appearance of the printed sheet 40 is in agreement with the O.K. sheet if the three-color half-tone field serving as the reference field on the printed sheet 40 evokes the same, in particular gray, color impression. For this reason, the spectral reflection values of the three-color half-tone field is entered as the actual value into the three-color half-tone memory 52 and compared indirectly with the spectral values present in the reflection value memory 51 as the desired value, following the conversion of the spectral reflection values into color location coordinates of a color coordinate system, in particular of the CIELAB or CIELUV systems.

From the spectral reflection values in the reflection value memory 51 correlated with, for example, 35 different wavelengths, the standard color values X, Y and Z are calculated in keeping with the formulas defined by the CIE (Commission Internationale de l'Eclairage) by means of a first standard color value computer 64. Correspondingly, in a second standard color value computer 65, the actual standard color values X, Y and Z are calculated from the spectral reflection values obtained from the reflection spectrum of the reference field on the printed sheet 40. The standard color value computers 64, 65 may be combined relative to hardware and in particular may be a component of the main processor of the printing installation and therefore, in a manner similar to the reflection value memories 51 to 63, may exist merely as software.

Instead of calculating the desired standard color values (and from them, as described below, the desired color locations) from the spectral reflection values read in by the measuring head of the reference field of the O.K. sheet, the coordinates of the desired color location may also be entered manually by means of the keyboard. This possibility is indicated in the drawing by the inlet line 69 of the first color location computer 66. In a purely theoretical manner, obviously the corresponding desired standard color values or the desired reflection values may also be entered manually, but this would not be very rational in actual practice. Corresponding possibilities are indicated in the drawing by the inlet lines 69' and 69''.

The desired standard color values calculated by the first standard color value computer 64 or manually entered and the actual standard color values according to CIE calculated by the second standard color value computer 65 are used as input values for a first color location computer 66 and a second color location computer 67, respectively. The first color location computer 66 and the second color location computer 67 calculate, in keeping with the CIE formulas, the color locations with the coordinates L, a and b or L, u and v of a CIE color space from the desired standard color values and the actual standard color values, respectively. The first color location computer 66 and the second color location computer 67 may be provided, as with all of the computers of the data processing apparatus 10, in the form of hardware and/or software, together with the other computers of the printing installation. Although in the following the CIE color space is explained with the color location coordinates L, a and b as an exemplary embodiment, the invention may be carried out with different color spaces also.

Figure 3:
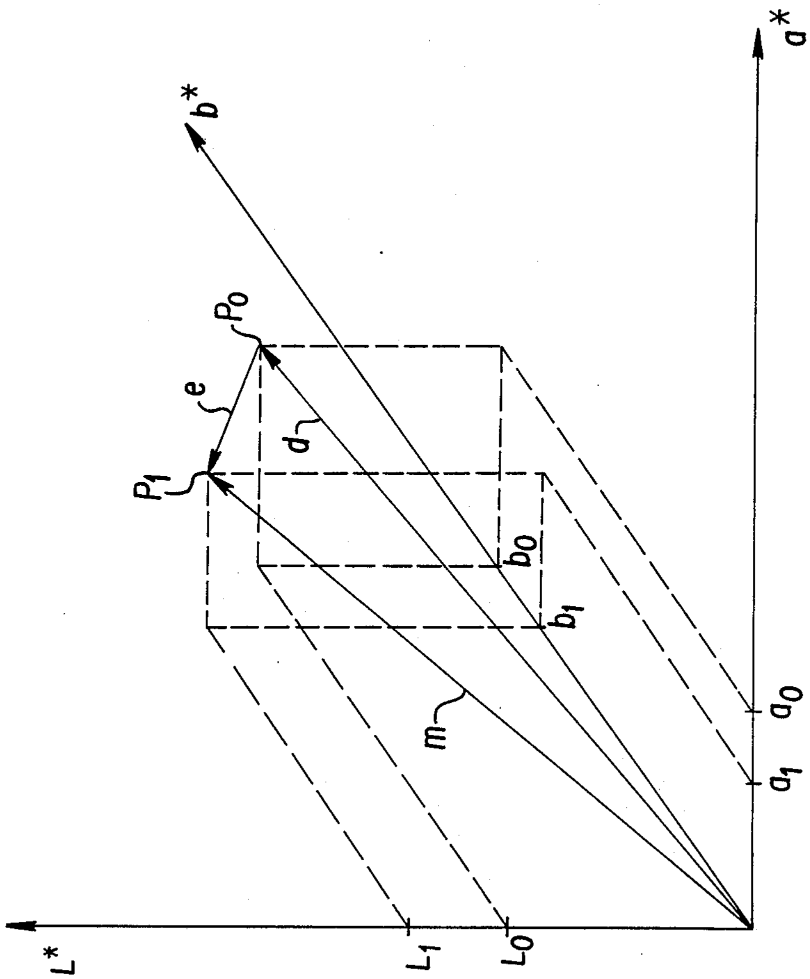
FIG. 3 shows a vector diagram to illustrate features of FIG. 2 in greater detail.

The desired color location vector determined by the first color location computer 66 for the color of the three-color half-tone field of the O.K. sheet is compared in a color deviation computer 68 with the actual value determined by the second color location computer 67 for the color location vector of the three-color half-tone field serving as the reference field on the newly printed sheet 40, in order to determine from the difference of the two color location vectors a color deviation vector, the length and orientation of which in the color space indicates the undesirable color deviation between the O.K. sheet and the newly printed sheet 40. FIG. 3 shows, for example, a desired color location vector d corresponding to a color location $P_0$ and an actual location vector m corresponding to an actual color location $P_1$. The points $P_0$ and $P_1$ are represented in a color space such as the $L^*$, $a^*$, $b^*$ color space, by the locations ($L_0$, $a_0$, $b_0$) and ($L_1$, $a_1$, $b_1$), respectively. A color deviation vector e represents the deviation between the vectors m and d.

The outlet of the color deviation computer 68 is connected with the first inlet 70 of a computer 71, which calculates a layer thickness variation from the color deviation vector $\Delta F$ and layer thickness variation control vector $\Delta S$, while a transformation vector is fed in through a second inlet 72, which for the prevailing working point defined by the actual standard color values X, Y, Z and the actual color location L, a, b represents a linear substitute function of the relationship between layer thicknesses and color locations for an infinitesimal environmental area of the working point, said relationship being extremely complex in actual practice. The values entered in the second inlet 72 for the calculation of the layer thickness variation control vector, the components of which form the control data 11 for the three printing colors, (for example cyan, yellow and magenta), are determined by means of a matrix computer 73, which calculates the components of a matrix A(i, j), which in the normal three-dimensional case is a matrix with nine elements in three columns and three rows.

FIG. 2 shows a matrix computer 73 and a matrix memory 74 for the components of the matrix A(i, j).

The matrix A(i, j) is inverted using a matrix inverter 75, so that at the second inlet 72 of the layer thickness variation computer, the elements of the inverted matrix $A^{-1}$ are present as the elements of a transformation function, which preferably is predetermined for each measurement of a reference field. If a deviation exists between the actual color location of the reference field scanned by the measuring head 42 and the desired color location, the layer thickness variations required for the printing inks to approximate the actual color location to the desired color location in the next print, are calculated by the layer thickness variation computer 71. The matrix A(i, j) stored in the matrix memory 74 contains as information the sensitivity of the color location variation on the basis of layer thickness variations. The matrix A(i, j) is therefore designated hereafter as the sensitivity matrix. Its elements may be determined experimentally, but in the process different matrix elements are valid for each color location. In view of the multitude of possible color locations and other effects, a considerable memory volume is required if experimentally determined sensitivity matrices are to be stored, in order to read out the values for a given working point. For this reason the elements of the sensitivity matrices in the exemplary embodiment shown in FIG. 2 are calculated separately for every working point defined by the standard color values X, Y, Z. The elements of the sensitivity matrix A(i, j) are the partial derivatives of the color location vector, in particular of the color location vector of one of the aforementioned color spaces, with respect to components of the layer thickness control vector. These components are calculated by means of the matrix computer 73, using computing rules based on a relative and linear model, whereby from the partial derivatives of the reflection variations per layer thickness variation, the color location shift dL, da, db is calculated, based on the layer thickness variation of the printing inks.

To make it possible for the matrix computer 73 to calculate the sensitivity matrix correlated with a freshly printed reference field, it is necessary to provide further half-tone and also full-tone fields during the printing of the color measuring strips with the color measuring fields 41, in addition to the field with a three-color half-tone. The color measuring fields 41 on the printed sheet 40 thus include for each of the three printing colors a single color half-tone field, with the half-tone fields the film surface covers corresponding to the three-color half-tone field or reference field. If the film surface coverages do not coincide with that of the three-color half-tone field, the surface coverages calculated must be interpolated. In addition, full-tone fields must be provided for the three printing colors. The color measuring fields 41 also comprise three full-tone fields, in which two printing colors are always printed over each other. Finally, the co-printed color measuring strips of the printed sheet 40 also contain a full-tone field with all three colors printed over, and a white field to determine the paper reflection.

To determine the sensitivity matrix of a certain freshly printed sheet, it is thus necessary for the measuring head 42 to determine the spectral reflection values for a plurality of different color measuring fields 41. For this reason, in FIG. 2 reflection value memories 53 to 63 are shown, which may exist in the hardware or software form. In the case of a hardware configuration, the inlet bus 50 is always connected with the reflection value memories 51 to 63, as the associated color measuring field 41 is being scanned by the measuring head 42. Each of the reflection value memories 53 to 63 stores, as do the reflection value memories 51 and 52, the spectral reflections correlated with a plurality of wavelengths, for example 35 different wavelength zones.

The matrix computer 73 has a working point entry 77, through which the prevailing standard color values are entered. Further, inlets of the matrix computer 73 are connected with the three reflection value memories 53 to 55, which contain for example the spectral reflection values of half-tone fields of the colors yellow, magenta and cyan. The reflection value memories 56 to 58 store 35 reflection values for each of the full-tone fields of the colors yellow, magenta and cyan, the layer thicknesses of which vary upon an adjustment of the color control elements analogously to the layer thicknesses of the printing ink in the half-tone fields.

As seen in FIG. 2, three reflection value memories 59 to 61 for full-tone fields are correlated with the matrix computer, said full-tone fields being produced by the overprinting of two printing colors and storing, in the example described, the spectral reflection values of the colors red, green and blue, obtained by overprinting. A reflection value memory 62 is provided to store the spectral reflection values of a full-tone field produced by the overprinting of all three printing colors and therefore is essentially black. Finally, in order to store the spectral reflection of the paper of the sheet 40, the reflection value memory 63 is provided, so that the matrix computer 73 is able to process reflection values relative to paper white, which are between 0 and 1.

To supply constants and parameters to the matrix computer 73, a constant and parameter inlet 76 is provided. The aforementioned computers and inlets may be present in the data processing apparatus 10 physically or in the form of software.

In accordance with the above discussion of the closed control loop (i.e., closed at the option of the operator) of the printing installation and the organization of the data processing apparatus 10, a method will be described whereby, after the scanning of the color measuring fields 41 of a freshly printed sheet, the sensitivity matrix A(i, j) is determined to produce thickness variation control vectors whereby the ink control elements are adjusted with the highest possible convergence velocity, so that during the production run of the sheet 40 a color deviation controlled regulation is obtained.

To determine the sensitivity matrix A(i, j) it is necessary to calculate its components. The elements of the sensitivity matrix are the partial derivations of the components of the color location vector with respect to the components of the layer thickness control vector. If, in keeping with the example described, the L*a*b* system of CIE is used, the partial derivatives of the coordinates L, a and b must be calculated with respect to the components of the layer thickness vector. The partial derivatives of the color space coordinates contain the actual standard color values X, Y and Z of the reference field measured and the partial derivatives of these standard color values with respect to the components of the layer thickness vector.

The determination of partial derivatives of the standard color values with respect to the three components of the layer density vectors may be effected empirically, with the values obtained being stored in a memory. In practice, however, this case is hardly feasible. Another possibility consists of calculating these values from time to time, for example at the onset of a printing process of numerous printed sheets 40, from the spectral reflection values stored in the reflection value memories 53 to 63. Instead of carrying out intermittent calculations, one may be effected for each individual printed sheet. Preferably, however, the partial derivatives of the measured actual standard color values with respect to the three components of the layer thickness vector are determined during each measurement of a reference field in a zone or a block of the printed sheet. The information stored in the reflection value memories 53 to 63 represents secondary values, which make it possible to determine for the principle value stored in the reflection value memory 52, the ink control changes necessary so that the color location associated with the principal value in the color space will be closer to the desired color location during the next printing and measurement.

The nine partial derivatives of the standard color values with respect to the components of the layer thickness vector or layer thickness control vector are obtained by the integration of an expression over the entire spectrum which essentially contains the partial derivatives of the reflection values, calculated on the basis of a model, of a three-color half-tone field with respect to the three layer thicknesses of the three printing inks. As the simplest model, computation by means of the Neugebauer equations is available, which in their differential form give the reflection variations of a three-color half-tone field as a function of the optically effective surface coverages, together with the reflections of the full-tone fields printed with the half-tone fields.

For this reason, the matrix computer 73 calculates the values contained in the Neugebauer equations in differential form and, in particular, the partial derivatives of the reflections of the full-tone fields as a function of the layer thicknesses of the associated inks, and the computer 73 further calculates the optically effective surface coverages using the relationships given by Murray-Davies, together with the optically effective derivatives as functions of the reflections of the single color full-tone fields correlated by the color.

The discussion presented above shows how it is possible to prepare a relative and linear model whereby it is not possible to calculate absolutely the new color location expected on the basis of ink control adjustments, but it is nevertheless possible to calculate the expected location with a significantly higher accuracy and reliability from the reflection and color location of the three-color half-tone field actually printed, with the relative inclusion of the reflection variation due to ink control adjustments. In case of a relative mode, errors (with the use of the correct sign) mainly affect the convergence velocity, but not the convergence as such. For this reason, a linear model as the simplest mode of model formation may be used with a linear substitute function in the working point, to calculate the reflection variation occurring in the three-color half-tone field as the reference field. The working point is obtained as a function of the reflection actually measured and the actual color location determined in this manner. The linear substitute function in the working point makes possible, on the basis of the reflection measured, an approximate theoretical determination of the color location of the new three-color half-tone field printed later with the adjusted ink controls. In the process, the "slope" or sensitivity in the working point is utilized to determine from the color deviation between the actually measured color location and the desired color location the necessary layer thickness changes or ink control changes, for the three-color half-tone field.

The formulas and calculations for the control algorithm with a linear model based on the Neugebauer equations and the relationships of colorimetry known to those skilled in the art, are given by the following exemplary embodiment.

The matrix computer 73 shown in FIG. 2 calculates for all of the zones or blocks the sensitivity matrices A(i, j), so that linear regulation is possible.

To calculate the sensitivity matrix A(i, j), initially the spectral single color half-tone emissions are interpolated (quadratically) into the corresponding half-tone values of the three-color half-tone field and stored in the appropriate reflection value memories 53–55. Only these interpolated values are used hereafter.

In a further step, from the ten secondary measured values contained in the reflection value memories 53 to 62, each with 35 individual spectral values, weighted with densitometric filter variations and relative to the paper white, the geometric surface coverage for the three colors is calculated by the following formula:

$$F_{RjGeom} = F_{RjFilm} + (F_{Dj} - F_{RjFilm})/3$$

In this equation $F_{Dj}$ signifies the optically effective surface coverage (according to Murray-Davies) for the color j, wherein, for example, $j=1$ is cyan, $j=2$ is magenta and $j=3$ is yellow. The film surface coverage $F_{RjFilm}$ is given by the measuring strip definition and it is not necessary to measure it. The formulas for the calculation of the geometric surface coverage are based on the assumption that the increase in the optically effective surface coverage consists of ⅓ of mechanical point enlargements and ⅔ of the capture of light.

The following calculations are carried out spectrally for the three colors over wavelengths between 380 and 730 nanometers, for example, in 35 steps. In order to prepare a paper white coverage, the coefficients $\beta_{Vj'} = \beta_{Vj}/\beta_{paper}$ are determined, wherein $\beta_{Vj}$ is the reflection value measured for a full-tone Vj of the printing color ink j, for the prevailing wavelength.

The matrix computer 73 calculates for each of the 35 wavelengths and for all full-tone colors j the partial derivatives of the spectral full-tone reflections as a function of layer thicknesses by the following formula:

$$\frac{d\beta_{Vj}}{dS_j} = \frac{(1 - r_{oj} - r_{2j}(1 - \beta_{Vj}))(\beta_{Vj} - r_{oj})}{(1 - r_{oj})(1 - r_{2j})} \cdot \ln 10 \frac{\log(\beta^*/\beta^*_{Paper})}{S_j}$$

wherein:

$$\beta^* = \frac{\beta_{Vj} - r_{oj}}{1 - r_{oj} - r_{2j} \cdot (1 - \beta_{Vj})}$$

$$\beta^*_{Paper} = \frac{\beta_{Paper} - r_{oj}}{1 - r_{oj} - r_{2j} \cdot (1 - \beta_{Paper})}$$

In this equation Sj is the instantaneous layer thickness of the printing ink j. It is derived from the machine characteristic (i.e., the relationship between a set value of the machine controls and the resulting layer thickness). $r_{Oj}$ is a constant representing the surface reflection of the paper for the printing ink j. In a first approximation, it is equal for all printing inks j. Furthermore, in view of the measuring optics (45°, 0°) and the use of a polarizer, it may be assumed to be negligibly small. It is therefore appropriate to set this constant in most cases equal to 0. The constant $r_{2j}$ expresses the total reflection in the ink layer and is again approximately equal for all printing inks j. If the internal reflection $r_{2j}$ is set equal to 0, the layer thickness is assumed to be proportional to the density. Reasonable values of $r_{2j}$ are between 0.4 and 0.6. The larger $r_{2j}$ is set, the higher the sensitivity and thus the control value.

Subsequently, the optically effective surface coverage $F_{Dj}$ is calculated in all 35 support locations for all three colors according to the Murray-Davies formula. If the spectral reflection value $\beta_{Vj}$ relative to the paper white of the associated full-tone field is larger than 0.95, the capture of light is assumed to be zero and in further calculations the optically effective surface coverage is replaced by the geometric surface coverage, in order to avoid a division of zero in the calculation of the optically effective surface coverage. Such a division by zero could appear, as the measured values contain a certain noise.

$$F_{Dj}=(1-\beta'_{Rj})/(1-\beta'_{Vj}) \text{ with } j=1, 2, 3.$$

Here, $\beta'_{Rj}$, is a value relative to paper white for a half-tone field with a single color j, stored in the reflection value memories 53 to 55.

$$(\beta'_{Rj}=\beta_{Rj}/\beta_{paper}).$$

Next, the program of the matrix computer 73 calculates for all wavelengths and for all colors the derivatives of the optically effective surface coverages $F_{Dj}$ as a function of the reflection values $\beta'_{Vj}$ of the single color full-tone fields according to the following equation:

$$\frac{dF_{Dj}}{d\beta'_{Vj}} = -P \cdot F_{Rj} \cdot (1 - F_{Rj}) \cdot \frac{(1 - \beta'^{\frac{1}{2}}_{Vj})^2}{(1 - \beta'_{Vj})^2 \cdot \beta'^{\frac{1}{2}}_{Vj}}$$

In this equation the paper constant P is a constant containing the paper and printing ink properties and may be entered for example through the inlet 76 into the matrix computer 73. The above relationship is based on a light capture model, wherein the paper constant P may be set equal to 1. The values of the paper constant P are between 0.1 and 1. The smaller the paper constant, the higher the sensitivity and thus the control variable.

With all of the values required to calculate the partial derivatives of the spectral reflections of a three-color half-tone field from the Neugebauer differential equations as functions of printing ink layer thicknesses, the following equations are used, in which $\beta_{R123}$ is the reflection of a three-color half-tone field and $\beta_{V12}$, $\beta_{V13}$ and $\beta_{V23}$ are the reflections of the full-tone fields associated with the reflection value memories 59 to 61 with two different colors printed over each other and $\beta_{V123}$ is the reflection of a full-tone field with three colors printed over.

$$\begin{aligned}
\frac{d\beta_{R123}}{dS_1} = ((- \; & (1 - F_{D2} - F_{D3} + F_{D2} \cdot F_{D3}) \cdot \beta_{paper} + \\
& (1 - F_{D2} - F_{D3} + F_{D2} \cdot F_{D3}) \cdot \beta_{V1} - \\
& (F_{D2} - F_{D2} \cdot F_{D3}) \cdot \beta_{V2} - \\
& (F_{D3} - F_{D2} \cdot F_{D3}) \cdot \beta_{V3} + \\
& (F_{D2} - F_{D2} \cdot F_{D3}) \cdot \beta_{V12} + \\
& (F_{D3} - F_{D2} \cdot F_{D3}) \cdot \beta_{V13} - \\
& F_{D2} \cdot F_{D3} \cdot \beta_{V23} + F_{D2} \cdot F_{D3} \cdot \beta_{V123}) \cdot \frac{dF_{D1}}{d\beta'_{V1}} \\
F_{D1}( \; & (1 - F_{D2} - F_{D3} + F_{D2} \cdot F_{D3}) \cdot \beta_{paper} + \\
& (F_{D2} - F_{D2} \cdot F_{D3}) \cdot \beta_{V2} + \\
& (F_{D3} - F_{D2} \cdot F_{D3}) \cdot \beta_{V3} + F_{D2} F_{D3} \beta_{V23}))/\beta_p \cdot \frac{d\beta_{V1}}{dS_1}
\end{aligned}$$

$$\begin{aligned}
\frac{d\beta_{R123}}{dS_2} = ((- \; & (1 - F_{D1} - F_{D3} + F_{D1} \cdot F_{D3}) \cdot \beta_{paper} + \\
& (1 - F_{D1} - F_{D3} + F_{D1} \cdot F_{D3}) \cdot \beta_{V2} - \\
& (F_{D1} - F_{D1} \cdot F_{D3}) \cdot \beta_{V1} - \\
& (F_{D3} - F_{D1} \cdot F_{D3}) \cdot \beta_{V3} + \\
& (F_{D1} - F_{D1} \cdot F_{D3}) \cdot \beta_{V12} + \\
& (F_{D3} - F_{D1} \cdot F_{D3}) \cdot \beta_{V23} - \\
& F_{D1} F_{D3} \cdot \beta_{V13} + F_{D1} F_{D3} \cdot \beta_{V123}) \cdot \frac{dF_{D2}}{d\beta'_{V2}} \\
F_{D2}( \; & (1 - F_{D1} - F_{D3} + F_{D1} F_{D3}) \cdot \beta_{paper} + \\
& (F_{D1} - F_{D1} F_{D3}) \cdot \beta_{V1} + \\
& (F_{D3} - F_{D1} F_{D3}) \cdot \beta_{V3} + F_{D1} F_{D3} \beta_{V13}))/\beta_p \cdot \frac{d\beta_{V2}}{dS_2}
\end{aligned}$$

-continued $$
\begin{aligned}
\frac{d\beta_{R123}}{dS_3} = ((- \ & (1 - F_{D1} - F_{D2} + F_{D1} \cdot F_{D2}) \cdot \beta_{paper} + \\
& (1 - F_{D1} - F_{D2} + F_{D1} \cdot F_{D2}) \cdot \beta_{V3} - \\
& (F_{D1} - F_{D1} \cdot F_{D2}) \cdot \beta_{V1} - \\
& (F_{D2} - F_{D1} \cdot F_{D2}) \cdot \beta_{V2} + \\
& (F_{D1} - F_{D1} \cdot F_{D2}) \cdot \beta_{V13} + \\
& (F_{D2} - F_{D1} \cdot F_{D2}) \cdot \beta_{V23} - \\
& F_{D1} \cdot F_{D2} \cdot \beta_{V12} + F_{D1}\, F_{D2} \cdot \beta_{V123}) \cdot \frac{dF_{D3}}{d\beta'_{V3}} \\
F_{D3}( \ & (1 - F_{D1} - F_{D2} + F_{D1}\, F_{D2}) \cdot \beta_{paper} + \\
& (F_{D1} - F_{D1}\, F_{D2}) \ \beta_{V1} + \\
& (F_{D2} - F_{D1}\, F_{D2}) \ \beta_{V2} + F_{D1}\, F_{D2}\, \beta_{V12}))/\beta_p \cdot \frac{d\beta_{V3}}{dS_3}
\end{aligned}
$$

Each of the Neugebauer differential equations cited above contains a first sum containing the reflection variations due to light capture variations, and a second sum containing the reflection variations due to changes in layer thickness. The effects of ink acceptance are neglected. The variation of the reflection of a layer of ink due to a change in layer thickness is assumed to be independent of whether the ink is printed entirely on paper or in part on another ink.

After the Neugebauer differential equations are evaluated for all three colors and all wavelengths, the matrix computer 73 calculates the sensitivity matrix A, which is inverted in the matrix inverter 75, (which may be integrated relative to software into the matrix computer 73).

From the CIE definition equations for standard color values the following nine relationships are obtained for the partial derivatives of the standard color values as functions of layer thicknesses:

$$\frac{dX}{dS_j} = \int B(\lambda) \cdot x(\lambda) \cdot \frac{d\beta_{R123}(\lambda)}{dS_j} \cdot d$$

$$\frac{dY}{dS_j} = \int B(\lambda) \cdot y(\lambda) \cdot \frac{d\beta_{R123}(\lambda)}{dS_j} \cdot d$$

$$\frac{dZ}{dS_j} = \int B(\lambda) \cdot z(\lambda) \cdot \frac{d\beta_{R123}(\lambda)}{dS_j} \cdot d$$

with $j = 1, 2, 3$

The above equations for the three printing inks, designated $j=1$, $j=2$ or $j=3$, yield nine numerical values for further processing following the insertion of the different values and integration over the wavelength and summing over the 35 support locations in the spectrum. In the equation $B(\lambda)$ signifies the spectral characteristic of the illumination and $\bar{x}(\lambda)$, $\bar{y}(\lambda)$ and $\bar{z}(\lambda)$ the standardized weighting functions according to CIE. The values $d\beta_{123}(\lambda)/dSj$ are values calculated by means of the Neugebauer differential equations, wherein for the sake of clarity the dependence on wavelength $\lambda$ is indicated as dSj which stands for $dS_1$, $dS_2$ and $dS_3$.

When the nine values of the partial derivatives of the standard color values as a function of the layer thicknesses of the three printing inks are available, they are used in the following relationships, obtained by the differentiation of the definition equations for L, a and b according to CIE:

$$\frac{dL}{dS_j} = \frac{116}{3} \cdot \left(\frac{Y}{Y_N}\right)^{-\frac{2}{3}} \cdot \frac{1}{Y_N} \cdot \frac{dY}{dS_j}$$

$$\frac{da}{dS_j} = \frac{500}{3}\left(\left(\frac{X}{X_N}\right)^{-\frac{2}{3}} \cdot \frac{1}{X_N} \cdot \frac{dX}{dS_j} - \left(\frac{Y}{Y_N}\right)^{-\frac{2}{3}} \cdot \frac{1}{Y_N} \cdot \frac{dY}{dS_j}\right)$$

$$\frac{db}{dS_j} = \frac{200}{3}\left(\left(\frac{Y}{Y_N}\right)^{-\frac{2}{3}} \cdot \frac{1}{Y_N} \cdot \frac{dY}{dS_j} - \left(\frac{Z}{Z_N}\right)^{-\frac{2}{3}} \cdot \frac{1}{Z_N} \cdot \frac{dZ}{dS_j}\right)$$

with $j=1, 2, 3$. $X_N$, $Y_N$ and $Z_N$ are standard color values of the completely white surface of the corresponding type of light and of the corresponding observer according to CIE.

Following the calculation of the nine derivatives of the three color space coordinates as functions of the layer thicknesses of the three inks, the sensitivity matrix A is formed and recorded in the matrix memory 74, which may be realized in the form of hardware or software. The nine elements of the sensitivity matrix that may be calculated from the above equations, yield the sensitivity matrix A(i, j):

$$A = \begin{bmatrix} \frac{dL}{dS_1} & \frac{dL}{dS_2} & \frac{dL}{dS_3} \\ \frac{da}{dS_1} & \frac{da}{dS_2} & \frac{da}{dS_3} \\ \frac{db}{dS_1} & \frac{db}{dS_2} & \frac{db}{dS_3} \end{bmatrix}$$

In this matrix, the derivatives as a function of $S_1$ signify the derivatives as a function of layer thickness of the first printing ink, for example cyan. The derivatives as functions of $S_2$ and $S_3$ concern the second and third printing inks, in particular magenta and yellow.

It follows from the foregoing description that the entire computation involves only ten, or if paper white is considered, eleven spectral reflection values with 35 individual values each, together with a few constants, which may be found in published tables, or may be determined once and for all by separate measurements known in themselves.

In the aforementioned normal case of a gray reference field, i.e, a reference field with a three-color half-tone, for A(i, j) a matrix with three columns and three rows is obtained in the aforedescribed manner, which is readily inverted to calculate the components of the layer thickness variation control vector as the control data.

It may occur, however, that it is desired to use, for an example, a pure cyan field or a field that contains only two overprinted colors instead of three, as the reference field. This means that it is desired to regulate the color print of a cyan half-tone or a two-color half-tone field. In such case the $3\times3$ matrix degenerates into a $1\times3$ matrix (one color, one vector) or into a $2\times3$ matrix (two colors). This is obvious, as the colors that are not considered, i.e., do not appear in the reference field, cannot contribute and therefore the corresponding elements of the matrix must disappear. Matrices with empty rows or empty columns cannot be inverted, as in an inversion a division by zero would appear. For this reason, such "degenerate cases" must be treated separately. Here, the desired color location is usually not located in the printable color space, as color deviations may also run in the direction of the "foreign" colors. The characteristics of the printable color space merely indicate the relationship between the layer thicknesses of the inks considered and the color locations obtained. This means, on the other hand, that the desired color location generally cannot be attained at all. In such cases, the matrix computer 73 makes it possible to determine a substitute desired color location, which is located on the substitute characteristic or substitute characteristic area defined by the degenerated "matrix" A in the color space. This substitute desired color location is then attainable. The substitute desired color deviation is calculated so that the distance between the original desired color location and the substitute characteristic or substitute characteristic area will be at a minimum. In the one-dimensional case the sensitivity matrix is a vector and in the two-dimensional case an area is defined. The substitute desired color location is determined as the piercing point of the perpendicular to the vector or the area through the original desired color location. If this is done, the values for the components of the layer thickness variation control vector may be determined simply by the rules of vector geometry from the color vector of the field measured (actual value, working point) and the color vector of the substitute desired value.

It may also happen, however, that for certain colors (for example black) it is desired to use the full-tone field as the reference field. This signifies that the sensitivity is calculated without secondary fields. The aforementioned sensitivity matrix is reduced to a single vector and the calculation of the capture of light and of surface coverage are eliminated. All further steps are the same as in the case of a half-tone field of a single color as the reference field.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. Process for the ink control of a printing machine with colorimetric ink control regulation, wherein on a printed sheet, color measuring strips with a plurality of color measuring fields are co-printed, which are optically scanned by means of a measuring head in order to determine the spectral intensity distributions of the color measuring fields in order to determine from a spectral color analysis of the measuring light, the spectral reflections and the color location of a reference field of a scanned color measuring field in a coordinate system and to produce by coordinate comparison a control variable for adjusting the ink control elements of the printing machine from a color deviation of the color measuring field scanned and a given desired color location, so that undesirable color deviations will become minimal in the sheets subsequently printed with the new ink control settings, said process comprising the steps of:

measuring, for color deviation determinations, the spectral reflection values of a reference field in the form of a half-tone field as the principal value for determining an actual color location;

determining as secondary values the spectral reflections of color measuring fields serving as secondary fields from which the sensitivity of a color location shift is calculated on the basis of a layer thickness variation; and determining from the distance between the measured actual color location of the reference field and the desired color location, and the sensitivity of the color location shift calculated on the basis of the secondary values, the layer thickness variations of printing inks required for the ink control to compensate for a color location deviation of the actual color location of the reference field from the desired color location of the reference field.

2. Process according to claim 1, wherein the half-tone field chosen as the reference field is a multi-color half-tone field.

3. Process according to claim 2, wherein the half-tone field chosen is a gray field.

4. Process according to claim 1, wherein the secondary fields include full-tone fields and half-tone fields of the printing colors involved.

5. Process according to claim 3, wherein the secondary fields are full-tone fields of the colors involved, full-tone fields with two overprinted printing inks, full-tone fields with all of the printing inks overprinted and half-tone fields in the printing colors involved.

6. Process according to claim 4, wherein the secondary fields are full-tone fields of the colors involved, full-tone fields with two overprinted printing inks, full-tone fields with all of the printing inks overprinted and half-tone fields in the printing colors involved.

7. Process according to claim 5, wherein the sensitivity of the color location shift is determined by means of a linear model.

8. Process according to claim 6, wherein the sensitivity of the color location shift is determined by means of a linear model.

9. Process according to claim 1, wherein the sensitivity of the color location shift is determined by means of a linear model.

10. Process according to claim 7, wherein the linear model is derived from effects of the individual color components and statistics of the overprinting as a function of Neugebauer equations describing the surface coverage of the individual printing inks, with consideration of the capture of light.

11. Process according to claim 8, wherein the linear model is derived from the effects of the individual color components and the statistics of the overprinting as a function of Neugebauer equations describing the surface coverage of the individual printing inks, with consideration of the capture of light.

12. Process according to claim 1, wherein the sensitivity of the color location shift is recalculated for every working point defined by the standard color values of the reference field scanned, as a sensitivity matrix.

13. Process according to claim 10, wherein the sensitivity of the color location shift is recalculated for every working point defined by the standard color values of the reference field scanned, as the sensitivity matrix.

14. Process according to claim 11, wherein the sensitivity of the color location shift is recalculated for every working point defined by the standard color values of the reference field scanned, as the sensitivity matrix.

15. Process according to claim 1, wherein the halftone field chosen as the reference field is composed of one color.

16. Process according to claim 1, wherein the halftone field chosen as the reference field is composed of two colors.

17. Process for the ink control of a printing machine with a colorimetric ink control regulation, wherein on sheets printed by the printing machine color measuring strips with a plurality of color measuring fields are co-printed, said fields being optically scanned by a measuring head to determine spectral intensity distributions of the color measuring fields, in order to determine from a spectral color analysis of the measuring light, the spectral reflections and the color location of the reference field of a color measuring field scanned in a coordinate system and to produce from the color deviation of the color measuring field scanned relative to a given desired color location, an adjusting value for the regulation of the ink control elements of the printing machine, so that undesirable color deviations on the sheet printed subsequently with the new ink control settings become minimal, said process comprising the steps of:

measuring, for color deviation determinations, the spectral reflection values of a reference field in the form of a full-tone field to determine an actual color locations;

calculating the transformation function of a color location shift for a layer thickness variation; and, determining from the distance between the measured actual color location of the reference field and the desired color location of the reference field, and the calculated sensitivity of the color location shift, the layer thickness variations of the printing inks required as a relative correction value for the ink controls to compensate the color location deviation of the actual color location of the reference field from the desired color location of the reference field.

18. Apparatus for the ink control of a printing machine, comprising:

at least one measuring head connected with a spectrometer to scan co-printed color measuring fields;

a measured data processing unit for processing measured data of the spectrometer into adjusting values for the printing machine, the data processing unit further including:

computer means for determining color deviations between an actual reference field and a desired reference field;

computer means for determining a layer thickness variation control vector required for ink corrections; and, matrix computer means to determine sensitivity of a color location shift.

19. Apparatus according to claim 18, wherein the computer means for determining color deviations comprises means for calculating standard color values; and, means for calculating color locations.

20. Apparatus according to claim 19, wherein the means for calculating standard color values is connected with reflection value memories for storing spectral reflection values of the desired reference field and of the actual reference field, and the matrix computer means is connected with reflection value memories for storing spectral reflections of secondary fields.

21. Apparatus according to claim 20, wherein the matrix computer means are equipped with a working point inlet connected with the means for calculating standard color values for the actual reference field.

22. Apparatus according to claim 21, wherein desired data may be entered into the computer means for determining color deviations.

23. Apparatus according to claim 22, wherein said desired data may be entered via a keyboard.

* * * * *